United States Patent
Guo et al.

(10) Patent No.: US 9,786,942 B2
(45) Date of Patent: Oct. 10, 2017

(54) MEMBRANE ELECTRODE AND FUEL CELL USING THE SAME

(71) Applicants: Jian-Wei Guo, Beijing (CN); Xiao-Lin Xie, Beijing (CN); Cheng Wang, Beijing (CN); Xiang-Ming He, Beijing (CN); Wen-Juan Wei, Beijing (CN); Chen-Chen Zhao, Beijing (CN)

(72) Inventors: Jian-Wei Guo, Beijing (CN); Xiao-Lin Xie, Beijing (CN); Cheng Wang, Beijing (CN); Xiang-Ming He, Beijing (CN); Wen-Juan Wei, Beijing (CN); Chen-Chen Zhao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 354 days.

(21) Appl. No.: 13/730,881

(22) Filed: Dec. 29, 2012

(65) Prior Publication Data

US 2014/0011112 A1    Jan. 9, 2014

(30) Foreign Application Priority Data

Jul. 5, 2012   (CN) .......................... 2012 1 0231368

(51) Int. Cl.
  *H01M 8/10*    (2016.01)
  *H01M 8/1004*   (2016.01)
  (Continued)

(52) U.S. Cl.
  CPC ....... *H01M 8/1004* (2013.01); *H01M 4/9083* (2013.01); *H01M 4/926* (2013.01); *H01M 8/1007* (2016.02); *B82Y 30/00* (2013.01)

(58) Field of Classification Search
  USPC ...................................................... 429/482
  See application file for complete search history.

(56) References Cited

U.S. PATENT DOCUMENTS

| | | | |
|---|---|---|---|
| 2006/0008697 A1* | 1/2006 | Kim ................. | B82Y 30/00 429/493 |
| 2006/0099485 A1* | 5/2006 | Yamaguchi ........... | B82Y 30/00 429/482 |

(Continued)

FOREIGN PATENT DOCUMENTS

| | | |
|---|---|---|
| CN | 101353477 | 1/2009 |
| CN | 102064311 | 5/2011 |

(Continued)

OTHER PUBLICATIONS

Wong et al., Preparation and Physical/Electrochemical Properties of Pt/C Nanocatalyst Stabilized by Citric Acid for Polymer Electrolyte Fuel Cells; Electrochimica Acta; 1973-1983; Sep. 7, 2004.*

(Continued)

*Primary Examiner* — Osei Amponsah
(74) *Attorney, Agent, or Firm* — Steven Reiss

(57) ABSTRACT

A membrane electrode includes a first electrode, a second electrode, and a proton exchange membrane sandwiched between the first electrode and the second electrode. The first electrode includes a first gas diffusion layer and a first catalyst layer. The second electrode includes a second gas diffusion layer and a second catalyst layer. The first catalyst layer or the second catalyst layer includes a carbon nanotube-metal particle composite including carbon nanotubes, polymer layer, and metal particles. The polymer layer is coated on a surface of the carbon nanotubes and defines a plurality of pores uniformly distributed; the metal particles are located in the pores. A fuel cell including the membrane electrode is also disclosed.

21 Claims, 5 Drawing Sheets

(51) Int. Cl.
H01M 4/90 (2006.01)
H01M 4/92 (2006.01)
H01M 8/1007 (2016.01)
B82Y 30/00 (2011.01)

(56) References Cited

U.S. PATENT DOCUMENTS

2009/0117437 A1    5/2009   Liu et al.
2012/0149547 A1    6/2012   Guo et al.

FOREIGN PATENT DOCUMENTS

| KR | WO 2007061248 A1 * | 5/2007 | ............ H01M 4/86 |
| TW | 200924268 | 6/2009 | |
| TW | 201223642 | 6/2012 | |
| WO | 2007061248 | 5/2007 | |

OTHER PUBLICATIONS

Che et al., Metal-Nanocluster-Filled Carbon Nanotubes: Catalytic Properties and Possible Applications in Electrochemical Energy Storage and Production, Langmuir, Jan. 5, 1999, 15 (3), pp. 750-758.*

* cited by examiner

US 9,786,942 B2

MEMBRANE ELECTRODE AND FUEL CELL USING THE SAME

CROSS-REFERENCE TO RELATED APPLICATIONS

This application claims all benefits accruing under 35 U.S.C. §119 from China Patent Application No. 201210231368.X, filed on Jul. 5, 2012, in the China Intellectual Property Office, the contents of which are hereby incorporated by reference. This application is related to common-assigned application entitled, "CARBON NANOTUBE-METAL PARTICLE COMPOSITE AND CATALYST COMPRISING THE SAME" filed Dec. 29, 2012 Ser. No. 13/730,883, entitled, "METHOD FOR MAKING CARBON NANOTUBE-METAL PARTICLE COMPOSITE" filed Dec. 29, 2012 Ser. No. 13/730,879.

BACKGROUND

1. Technical Field

The present disclosure relates to a membrane electrode and a fuel cell using the membrane electrode.

2. Description of Related Art

A fuel cell is an electrochemical power device. The fuel cell can convert a chemical energy of a fuel and an oxidant gas into an electrical energy through an electrochemical reaction. The fuel cells are usually classified as alkaline fuel cells, solid oxide fuel cells, and proton exchange membrane fuel cells.

The proton exchange membrane fuel cells commonly include a membrane electrode, a current collecting plate, and a flow guide plate. The membrane electrode includes a proton exchange membrane, a gas diffusion layer and a catalyst layer. The catalyst layer commonly includes a catalyst, a catalyst carrier, a proton conductor, and adhesive. In general, the catalyst is nano-scale precious metal particles. The precious metal particles are easily aggregated and have an uneven diameter distribution. Thus, a utilization rate of the catalyst is low, and a work efficiency of the fuel cell is decreased.

What is needed, therefore, is to provide a membrane electrode having a high utilization rate of the catalyst, and a fuel cell using the same.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
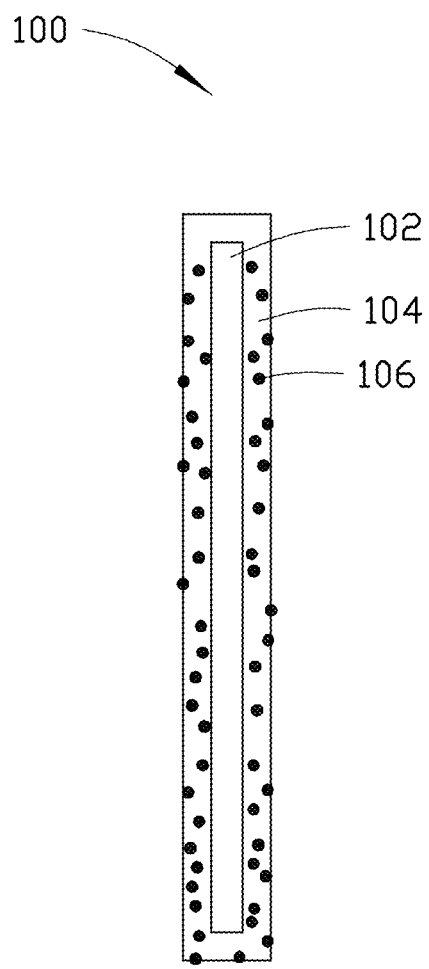
FIG. 1 is a structural schematic view of one embodiment of a carbon nanotube-metal particle composite.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

One embodiment of a method for making a carbon nanotube-metal particle composite includes the following steps:

S1, providing carbon nanotubes, polymer monomers, a first solution containing metal ions, and a second solution containing carboxylic acid radical ions;

S2, mixing the carbon nanotubes and the polymer monomers in a solvent to form a first mixture, wherein the polymer monomers are adsorbed on a surface of the carbon nanotubes;

S3, forming a second mixture by mixing the first mixture, the first solution, and the second solution, wherein the polymer monomers, the first solution, and the second solution react with each other to form a coordination complex mixture containing the metal ions, the coordination complex mixture is adsorbed on the surface of the carbon nanotubes; and S4, adding a reducing agent into the second mixture to reduce the metal ions of the coordination complex mixture to metal particles and simultaneously polymerize the polymer monomers, thereby forming the carbon nanotube-metal particle composite in situ.

In the step S1, the carbon nanotubes can be single-walled carbon nanotubes (SWCNTs), double-walled carbon nanotubes (DWCNTs), multi-walled carbon nanotubes (MWCNTs), or any combination thereof. The carbon nanotubes can be fabricated by a method of arc discharge, chemical vapor deposition (CVD), or laser evaporation. In one embodiment, the MWCNTs fabricated by the CVD method are used. An inner diameter of the MWCNTs can be in a range from about 10 nanometers to about 50 nanometers. An outer diameter of the MWCNTs can be in a range from about 30 nanometers to about 80 nanometers. A length of the MWCNTs can be in a range from about 50 microns to about 100 microns.

The polymer monomers and the carbon nanotubes are adsorbed with each other. The polymer monomers can be aniline, pyrrole, thiophene, amide, propylene imine, or derivates thereof. The derivate, for example, can be acetanilide, methylpyrrole, ethylenedioxythiophene, oxamide or caprolactam. The polymer monomers can be other substances capable of having a polymerization to form a polymer coated on integral surface of single or plural of carbon nanotubes. In one embodiment, the polymer monomers are aniline.

If the carbon nanotube-metal particle composite is to be used as a catalyst, the metal ions in the first solution can be precious metal ions or some metal ions having a good catalytic performance. The precious metal ions can be at least one of gold ions ($Au^{3+}$), silver ions ($Ag^+$), platinum ions ($Pt^{4+}$), rhodium ions ($Rh^{3+}$), iridium ions ($Ir^{4+}$). The metal ions having a good catalytic performance can be at least one of copper ions ($Cu^{2+}$), ferrous ions ($Fe^{2+}$), cobalt ions ($Co^{2+}$), and nickel ions ($Ni^{2+}$). Accordingly, the first solution can be a salt or an acid solution containing the metal ions. The first solution can be chloroauric acid ($HAuCl_4$), gold chloride ($AuCl_3$), silver nitrate ($AgNO_3$), chloroplatinic acid ($H_2PtCl_6$), ruthenium chloride ($RuCl_3$), chlororhodic acid ($H_3RhCl_6$), palladium chloride ($PdCl_2$), hexachloroosmic acid ($H_2OsCl_6$), hexachloroiridic acid ($H_2IrCl_6$), copper sulfate ($CuSO_4$), ferrous chloride ($FeCl_2$), or any combination thereof. In one embodiment, the first solution is $H_2PtCl_6$ water solution. In addition, the carbon nanotube-metal particle composite can be used in other fields, thus, the metal ions are not limited to the above mentioned species.

The second solution can have a complex action with the metal ions and the polymer monomers. Thus, the metal ions and the polymer monomers can be uniformly dispersed in the second solution. The second solution can be a carboxylic acid solution or a carboxylic salt solution. In one embodiment, the carboxylic acid or the carboxylic salt in the second solution includes at least two carboxylic acid groups (—COO—). The carboxylic salt can be sodium citrate ($Na_3C_6H_5O_7$) or potassium citrate ($K_3C_6H_5O_7$). The carboxylic acid can be citric acid ($C_6H_8O_7$), oxalic acid ($C_2H_2O_4$), malonic acid ($C_3H_4O_4$), butane diacid ($C_4H_6O_4$), adipic acid ($C_6H_{10}O_4$), terephthalic acid ($C_8H_8O_4$), glutaric acid ($C_5H_8O_4$), or any combination thereof. In one embodiment, the second solution is $Na_3C_6H_5O_7$ water solution.

In the step S2, the polymer monomers are dissolved in the solvent and adsorbed on the surface of the carbon nanotubes. The solvent can be ethanol, diethyl ether, water, or any combination thereof. To uniformly disperse the carbon nanotubes in the solvent, the solvent can be a mixing liquid of two substances. In one embodiment, the solvent is a mixture of water and ethanol, and a volume ratio of the water to the ethanol is about 1:1. A mass ratio of the carbon nanotubes to the polymer monomers can be in a range from about 1:1 to about 1:7. In one embodiment, the mass ratio of the carbon nanotubes to the polymer monomers is 1:1.

The step S2 can further include a step of agitating the first mixture. After agitating the first mixture, the polymer monomers can be uniformly adsorbed on the surface of the carbon nanotubes, and the carbon nanotubes can be uniformly dispersed in the solvent. In one embodiment, the first mixture is ultrasonically dispersed for about 3 hours to about 8 hours.

The step S2 can further include a step of functionalizing the carbon nanotubes by using hydrophilic groups before mixing the carbon nanotubes and the polymer monomers.

The hydrophilic groups can be carboxyl groups, hydroxide groups or amide groups. In one embodiment, at least two carboxyl groups are provided by a carboxyl acid. The carboxyl acid can be $C_6H_8O_7$, $C_2H_2O_4$, $C_3H_4O_4$, $C_4H_6O_4$, $C_6H_{10}O_4$, $C_8H_8O_4$, $C_5H_8O_4$, or combinations thereof. One or some of the carboxyl groups are used to surface functionalize the carbon nanotubes, thereby increasing a dispersion ability of the carbon nanotubes in water. The spare carboxyl groups that do not react with the carbon nanotubes are electrostatically attracted to the polymer monomers. Thus, an improved polymer coating of the carbon nanotubes can be obtained. The polymer monomers are adsorbed on the surface of the carbon nanotubes by the carboxyl groups.

In the step S3, a complex reaction occurs between the metal ions and the carboxylic acid radical ions, and a complex reaction occurs between the polymer monomers and the carboxylic acid radical ions, thereby forming the coordination complex mixture adsorbing on the surface of the carbon nanotubes. A molar ratio of the carboxyl acid salt or the carboxyl acid in the second solution to the metal ions of the first solution can be in a range from about 1:1 to about 5:1. In one embodiment, the molar ratio of the $Na_3C_6H_5O_7$ in the second solution to Pt ions of the $H_2PtCl_6$ in the first solution is about 1:1. In addition, a molar ratio of the carboxyl acid salt or the carboxyl acid in the second solution to the polymer monomers can be in a range from about 1:1 to about 1:6. In one embodiment, the molar ratio of the carboxyl acid salt or the carboxyl acid in the second solution to the polymer monomers is about 1:2.

In the step S3, the first mixture, the first solution and the second solution can be simultaneously or successively added into a reactor to form the second mixture.

In one embodiment, the step S3 further includes the sub-steps of:

S31, mixing the first solution and the second solution to form a mixing liquid; and S32, adding the first mixture into the mixing liquid, thereby inducing a reaction between the first mixture and the mixing liquid to form the coordination complex mixture.

In the step S31, the carboxylic acid radical ions in the second solution have an excellent complexation. Thus, the metal ions existing in a form of complex ions can be stably dispersed in the mixing liquid. The carboxylic acid radical ions have a guide function to fix the reduced metal particles on the carbon nanotubes.

Furthermore, the mixing liquid can be stirred or supersonically dispersed. In one embodiment, the mixing liquid is supersonically dispersed for about 8 hours to about 12 hours.

In the step S32, to introduce the complete reaction, the first mixture can be slowly added into the mixing liquid. In addition, after adding the first mixture into the mixing liquid, a potential difference between the metal ions and the polymer monomers can be formed due to the carboxylic acid radical ions, thereby partly reducing the metal ions and partly oxidizing the polymer monomers. The carboxylic acid radical ions can have a complex reaction with the polymer monomers. Besides, the carboxylic acid radical ions can be also electrostatically attracted or chemically bonded with the polymer monomers. Thus, the carboxylic acid radical ions can be adsorbed on the surface of the carbon nanotubes. In addition, the carboxylic acid radical ions can also have a complex reaction with the metal ions to form a stable complex, whereby the metal ions in the complex can be uniformly dispersed on the surface of the carbon nanotubes.

In the step S3, a temperature of the complex reaction can be in a range from about 4° C. to about 100° C. The temperature is related to a type of the metal ions. In one embodiment, the temperature is about 15° C.

The step S3 further includes a step of adjusting a pH value of the second mixture, by which the coordination complex mixture can be stably distributed in the solvent. In addition, the pH value of the second mixture can be adjusted at the beginning of the complex reaction, and kept up until the reaction ends. The pH value of the second mixture can be adjusted in a range from about 2 to about 5. In one embodiment, the pH value of the second mixture is adjusted to 3.

In the step S4, the polymer monomers are oxidized to form the polymer adsorbing on the surface of the carbon nanotubes under the action of the reducing agent. Meanwhile, the metal complex ions in the coordination complex mixture are reduced to form the metal particles, thereby forming the carbon nanotube-metal particle composite in situ. The reduction of the metal complex ions and the polymerization of the polymer monomers are simultaneous. Thus, the reduced metal particles are adsorbed between the carbon nanotubes and the polymer. In addition, the carboxyl groups in the second solution added in step S3 act as a bridge between the metal particles and the polymer. The carboxyl groups not only electrostatically attract or chemically bond to the polymer but also strongly absorb the metal particle. The metal particles can be stably dispersed due to the spare carboxyl groups. In addition, the carboxyl groups can improve a phase separation between the polymer and the metal particles. Thus, a plurality of pores are formed in the polymer, and the metal particles are located in the pores and adsorbed on the surface of the carbon nanotubes due to a guide function of the carboxyl groups. A dispersing uniformity of the metal particles in the carbon nanotube-metal particle composite can be improved due to the metal particles being located in the uniformly distributed pores of the polymer.

The reducing agent can reduce the metal ions to the metal particles. The reducing agent can be at least one of sodium borohydride ($NaBH_4$), formaldehyde ($CH_2O$), hydrogen peroxide ($H_2O_2$), $C_6H_8O_7$, hydrogen ($H_2$), and ascorbic acid. In one embodiment, the reducing agent is the $NaBH_4$ solution. A molar ratio of the reducing agent to the metal ions can be in a range from about 10:1 to about 60:1. In one embodiment, the molar ratio of $NaBH_4$ to $HAuCl_4$ is about 50:1.

The carbon nanotube-metal particle composite is formed in situ due to the carboxyl groups. The metal particles in a form of nanocluster have a small diameter. The metal particles are adsorbed on the surface of the carbon nanotubes. The nanocluster is a microscopic aggregation composed of a plurality of metal atoms combined with each other by physical or chemical force. In one embodiment, the metal particles are a nanocluster composed of less than or equal to 55 metal atoms.

In the step S4, the carbon nanotube-metal particle composite is purified. Specifically, the carbon nanotube-metal particle composite can be filtered and washed for many times. Furthermore, the carbon nanotube-metal particle composite can be dried.

The above method for making the carbon nanotube-metal particle composite is simple. In the method, the metal particles are slowly reduced, thus, a shape of the metal particles can be easily controlled.

Figure 2:
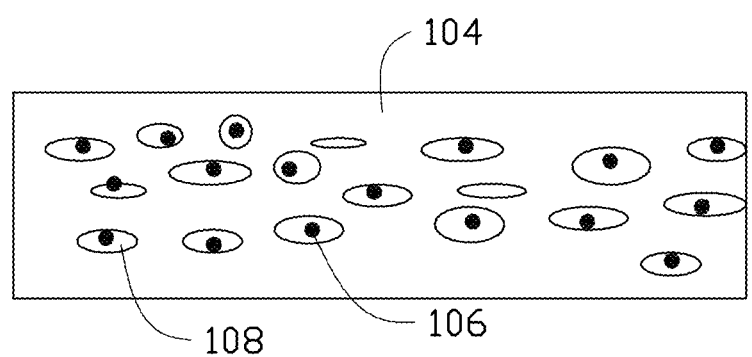
FIG. 2 is a distribution schematic view of a polymer and metal particles in the carbon nanotube-metal particle composite of FIG. 1.

Referring to FIGS. 1 and 2, the carbon nanotube-metal particle composite 100 includes carbon nanotubes 102, a polymer layer 104 coated on the surface of the carbon nanotubes, and the metal particles 106.

The polymer layer 104 can be coated on the surface of the single carbon nanotube. A thickness of the polymer layer 104 can be in a range from about 1 nanometer to about 7 nanometers. The polymer layer 104 defines a plurality of pores 108. The plurality of pores 108 are uniformly distributed. The metal particles 106 are located in the pores 108 and spaced from each other by the polymer of the polymer layer 104. Thus, the metal particles 106 are uniformly distributed on the surface of the carbon nanotubes 102. In addition, the metal particles 106 in the pores 108 can be directly adsorbed on the surface of the carbon nanotubes 102 or partly inserted in the polymer layer 104, and exposed out from the surface of the polymer layer 104. In one embodiment, only one metal particle 106 is located in one pore 108. The metal particles 106 are adsorbed in the pores 108, thus, the metal particles 106 are uniformly dispersed in the carbon nanotube-metal particle composite 100. A diameter of the metal particles 106 is in a range from about 1 nanometer to about 5 nanometers. In one embodiment, the diameter of the metal particles 106 is in a range from about 1 nanometer to about 2 nanometers. A mass percentage of the metal particles 106 to the carbon nanotube-metal particle composite 100 can be in a range from about 20% to about 70%. A material of the polymer layer 104 is a conductive polymer, such as polyaniline (PANI), polypyrrole (PPY), polythiophene (PT), polyamide (PA), polypropyleneimine (PPI), poly(N-acetylaniline)(PNAANI), poly(N-methylpyrrole), poly(3,4-ethylendioxythiophene) (PEDT), polycaprolactam, or any combination thereof.

A material of the metal particles 106 can be noble metal or catalyst metal. The noble metal can be gold (Au), silver (Ag), platinum (Pt), rhodium (Rh), iridium (Ir), or any combination thereof. The catalyst metal can be copper (Cu), iron (Fe), cobalt (Co), nickel (Ni), or any combination thereof. The carbon nanotubes can be SWCNTs, DWCNTs, MWCNTs, or any combination thereof.

In one embodiment, the carbon nanotube-metal particle composite 100 is Pt/PANI/MWCNT composite. The Pt particle is a nanocluster having a diameter of about 1 nanometer to about 2 nanometers.

In one embodiment, a catalyst is provided. The catalyst includes the carbon nanotube-metal particle composite 100. In addition, the catalyst can further include other common catalyst material such as noble metal particles. The catalyst can be used in different devices, such as electrochemical reactors (e.g. membrane reactor using oil energy) or cells (e.g. fuel cells).

In the carbon nanotube-metal particle composite 100 of the catalyst, the carboxyl groups can strongly adsorb the metal particles, thereby increasing a loading quantity of the metal particles in the catalyst. In addition, the metal particles are uniformly dispersed in the carbon nanotube-metal particle composite 100, thereby increasing a utilization rate of the catalyst. Thus, a catalyst property of the catalyst is improved.

Figure 3:
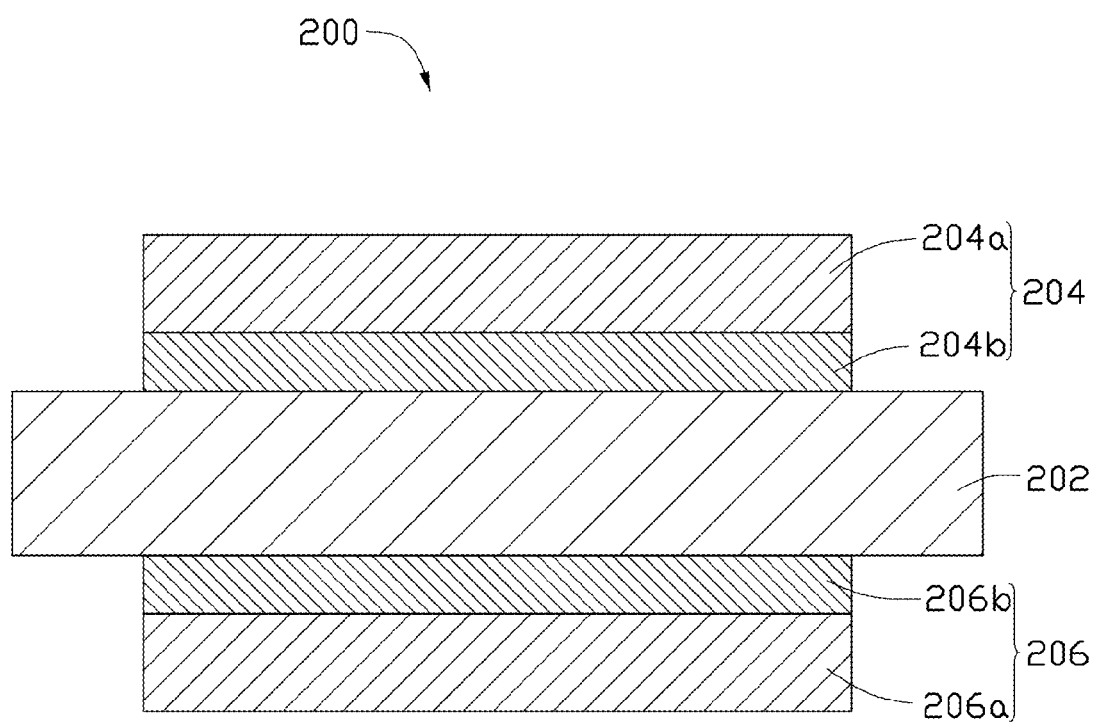
FIG. 3 is a structural schematic view of one embodiment of a membrane electrode.

Referring to FIG. 3, one embodiment of a membrane electrode 200 includes a proton exchange membrane 202, a first electrode 204 and a second electrode 206. The proton exchange membrane 202 is sandwiched between the first electrode 204 and the second electrode 206. The first electrode 204 includes a first gas diffusion layer 204a and a first catalyst layer 204b. The second electrode 206 includes a second gas diffusion layer 206a and a second catalyst layer 206b. In the first electrode 204 and the second electrode 206, the catalyst layer is disposed between the gas diffusion layer and the proton exchange membrane 202.

At least one of the first catalyst layer 204b and the second catalyst layer 206b includes the carbon nanotube-metal particle composite 100. In one embodiment, both the first catalyst layer 204b and the second catalyst layer 206b include the carbon nanotube-metal particle composite 100. In another embodiment, both the first catalyst layer 204b and the second catalyst layer 206b are composed of only the carbon nanotube-metal particle composite 100. The carbon nanotube-metal particle composite 100 is uniformly distributed in the catalyst layer. A quantity of the metal particles of the carbon nanotube-metal particle composite 100 in the catalyst layer can be in a range from about 0.3 mg/cm$^2$ to about 2 mg/cm$^2$. In one embodiment, the quantity of the metal particles is less than 0.4 mg/cm$^2$. The carbon nanotube-metal particle composite 100 can exist in a form of slurry. In the process for fabricating the membrane electrode 200, the carbon nanotube-metal particle composite 100 in the form of the slurry is coated on the surface of the proton exchange membrane 202 or the gas diffusion layer, and then the coated carbon nanotube-metal particle composite 100 is dried.

A material of the first gas diffusion layer 204a can be the same as a material of the second gas diffusion layer 206a. The material of the gas diffusion layer can be a porous material having a plurality of pores, such as a carbon fiber paper or a carbon nanotube film including a plurality of carbon nanotubes. In one embodiment, both the first gas diffusion layer 204a and the second gas diffusion layer 206a are a carbon nanotube film. If the carbon nanotube-metal particle composite 100 is coated on the surfaces of the first gas diffusion layer 204a and the second gas diffusion layer 206a, the carbon nanotube-metal particle composite 100 can be distributed in a plurality of pores of the first gas diffusion layer 204a and the second gas diffusion layer 206a.

A material of the proton exchange membrane 202 can be a proton exchange resin containing sulfonic acid group. The proton exchange resin can be perfluorosulfonic acid resin or sulfonate polymer having a proton exchange function and excellent thermal stability. The sulfonate polymer can be sulfonated polyether sulphone resin, sulfonated polyphenylene sulfide resin, sulfonated polybenzimidazole resin, sulfonated phosphorus enrichment nitriles resin, sulfonated polyimide resin, sulfonated polystyrene-polyethylene copolymer resin, or any combination thereof.

Figure 4:
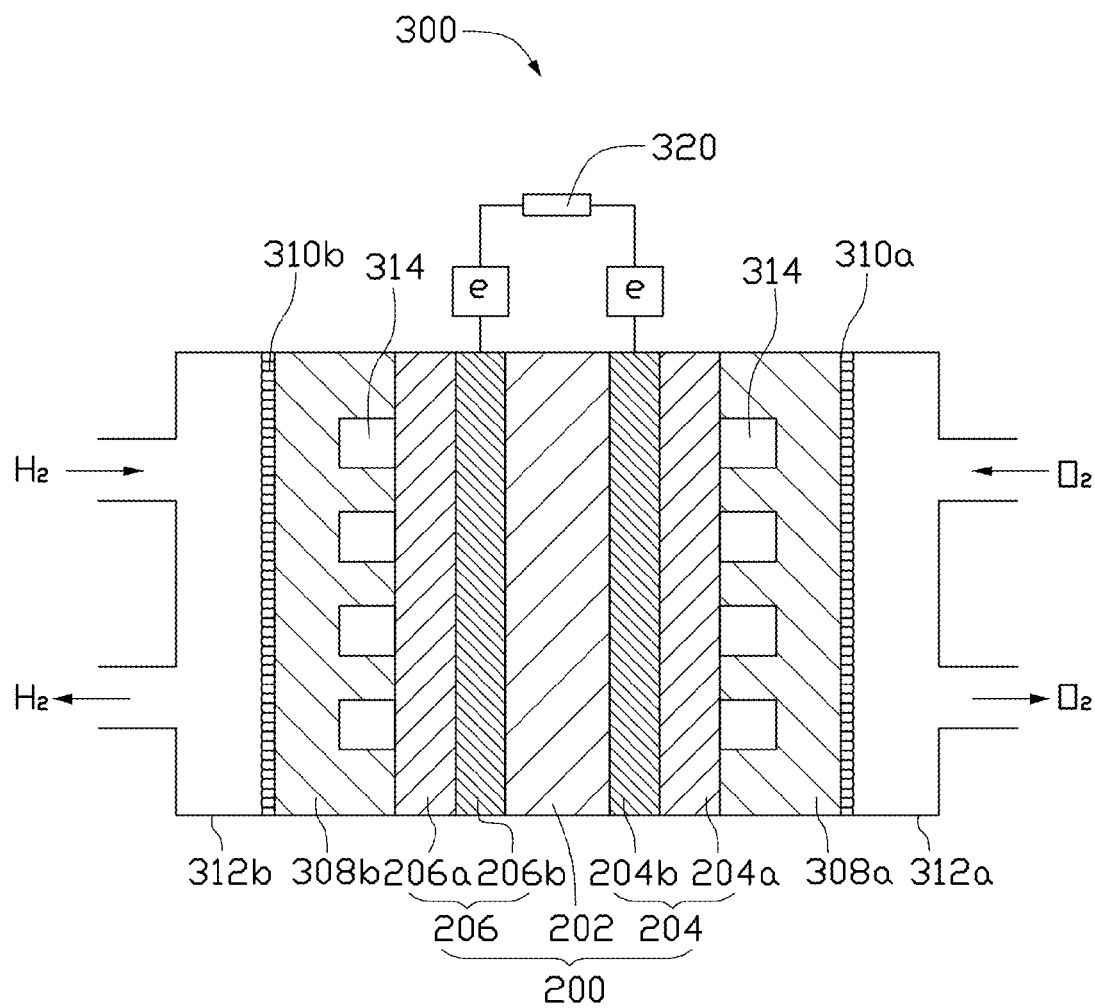
FIG. 4 is a structural schematic view of a fuel cell using the membrane electrode of FIG. 3.

Referring to FIG. 4, one embodiment of a fuel cell 300 includes the membrane electrode 200, a first guide plate 308a, a second guide plate 308b, a first current collecting plate 310a, a second current collecting plate 310b, a first auxiliary element 312a, and a second auxiliary element 312b.

The first guide plate 308a is disposed on a surface of the first electrode 204 away from the membrane electrode 200. The second guide plate 308b is disposed on a surface of the second electrode 206 away from the membrane electrode 200. The first guide plate 308a and the second guide plate 308b can be used to transfer a fuel gas, an oxidant gas, or a reaction resultant (e.g. water). The first guide plate 308a and the second guide plate 308b are made of metal or conductive material (e.g. carbon). The first guide plate 308a and the second guide plate 308b define a plurality of guide grooves 314. The guide grooves 314 are in contact with the gas diffusion layer and used to transfer the fuel gas, the oxidant gas, or the reaction resultant (e.g. water).

The first current collecting plate 310a is disposed on a surface of the first guide plate 308a away from the membrane electrode 200. The second current collecting plate 310b is disposed on a surface of the second guide plate 308b away from the membrane electrode 200. The first current collecting plate 310a and the second current collecting plate 310b are used to collect or transfer electrons. A material of the first current collecting plate 310a and the second current collecting plate 310b can be a conductive material. The first current collecting plate 310a or the second current collecting plate 310b is optional.

The first auxiliary element 312a or the second auxiliary element 312b can include a blower (not shown), a pipe (not shown), and a valve (not shown). The blower is connected with the guide plate by the pipe. The blower is used to provide the fuel gas or the oxidant gas. The first auxiliary element 312a and the second auxiliary element 312b are optional because the fuel gas or the oxidant gas can directly diffuse toward the fuel cell 300. In one embodiment, the fuel gas is hydrogen. The oxidant gas is oxygen or air containing oxygen.

In use, the fuel gas ($H_2$) is introduced into the second electrode 206 through the second guide plate 308b. The oxidant gas (e.g. oxygen gas, $O_2$) is introduced into the first electrode 204 through the first guide plate 308a. The hydrogen gas is transferred to the second catalyst layer 206b through the second gas diffuse layer 206a. A reaction of the hydrogen gas can be executed under the catalysis of the catalyst. An equation of the reaction can be: $H_2 \rightarrow 2H^+ + 2e$. The hydrogen ions produced by this reaction reach the first electrode 204 through the proton exchange membrane 202. The electrons are transferred to the external circuit.

On the other end of the fuel cell 300, the oxygen gas is introduced into the first electrode 204. The electrons of the external circuit are transferred to the first electrode 204. A reaction of the oxygen gas, the hydrogen ions, and the electrons can be executed under the catalysis of the catalyst. An equation of the reaction can be: $\frac{1}{2}O_2 + 2H^+ + 2e \rightarrow H_2O$. The water produced by the above reaction can be expelled out through the first gas diffusion layer 204a and the first guide plate 308a.

In the above use process of the fuel cell 300, an electric potential difference is formed between the first electrode 204 and the second electrode 206. If a load 320 is connected with the external circuit, a current will be formed. The metal particles of the catalyst layer are uniformly dispersed and have a small diameter. Thus, the catalyst having an excellent catalysis increases a reaction speed of the first electrode 204 and the second electrode 206 and improves a current efficient and an output power. A power of the fuel cell 300 containing 1 gram metal particles can be in a range from about 800 W/g to about 1500 W/g.

EXAMPLE 1

Synthesis of the Pt/PANI/MWCNT Composite

Figure 5:
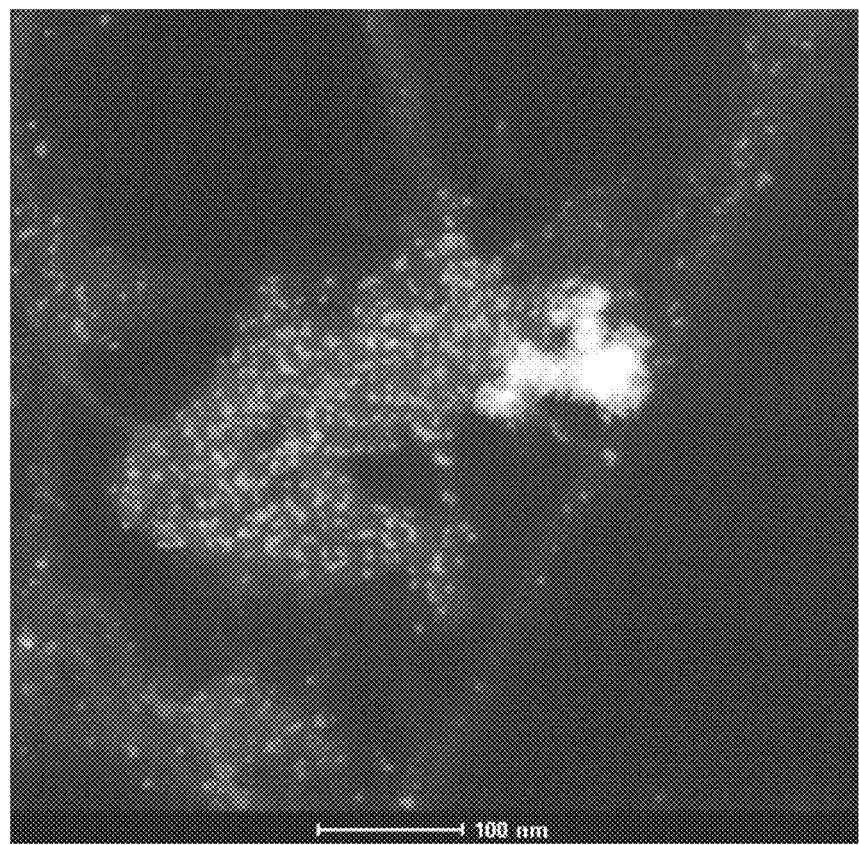
FIG. 5 is a scanning transmission electron microscope image of the carbon nanotube-metal particle composite of FIG. 1.

MWCNTs and aniline are added into a first mixing liquid containing water and ethanol to form the first mixture. A volume ratio of the water to the ethanol is about 1:1. The first mixture is ultrasonically vibrated for about 3 hours. A $Na_3C_6H_5O_7$ water solution and an $H_2PtCl_6$ water solution are mixed to form a second mixing liquid. The second mixing liquid is ultrasonically vibrated for 8 hours. The first mixture is then added to the second mixing liquid to introduce a complex reaction under water bath of about 15° C., thereby forming a coordination complex mixture. The mixture of the first mixture and the second mixing liquid is ultrasonically vibrated for about 1 hour. A mass ratio among the $Na_3C_6H_5O_7$, the aniline, and the MWCNTs is about 1:2:2. A $NaBH_4$ solution is then added into the mixture of the first mixture and the second mixing liquid to form a precipitate. A molar ratio of the $Na_3C_6H_5O_7$ to the $H_2PtCl_6$ is about 50:1. The precipitate is then filtered and washed. The washed precipitate is dried for about 3 hours under about 60° C. to form the Pt/PANI/MWCNT composite. The Pt particles in a form of the nanocluster having a diameter of about 1 nanometer to about 2 nanometers are loaded on the MWCNTs or the PANI. A mass percentage of the Pt particles to the Pt/PANI/MWCNT composite is about 30%. Referring to FIG. 5, Pt particles are uniformly dispersed on the carbon nanotubes and the PANI.

EXAMPLE 2

Synthesis of the Au/PANI/MWCNT Composite

The Au/PANI/MWCNT composite is synthesized by the same method as in Example 1, except that the $HAuCl_4$ solution replaces the $H_2PtCl_6$ solution and a temperature of water bath is about 25° C. The Au particles in the Au/PANI/MWCNT composite are in a form of a nanocluster having a diameter of about 1 nanometer to about 3 nanometers. A mass percentage of the Au particles to the Au/PANI/MWCNT composite is about 60%.

EXAMPLE 3

Synthesis of the Fe/PANI/MWCNT Composite

The Fe/PANI/MWCNT composite is synthesized by the same method as in Example 1, except that the $FeCl_2$ solution replaces the $H_2PtCl_6$ solution and a temperature of water bath is about 100° C. The Fe particles in the Au/PANI/MWCNT composite are in a form of a nanocluster having a diameter of about 2 nanometers to about 5 nanometers. A mass percentage of the Fe particles to the Fe/PANI/MWCNT composite is about 50%.

EXAMPLE 4

A Preparation of the Catalyst Layer of the Fuel Cell

The catalyst layer is made of the Pt/PANI/MWCNT composite of the example 1. During the process of making the catalyst layer, the Pt/PANI/MWCNT composite and the perfluorosulfonic acid resin solution are dispersed in an isopropyl alcohol water solution to form a catalyst slurry. The proton exchange membrane is made of porous perfluorosulfonic acid film and immersed in the catalyst slurry. After immersing the porous perfluorosulfonic acid film, the porous perfluorosulfonic acid film is taken out from the catalyst slurry and dried to form the catalyst layer on the porous perfluorosulfonic acid film. A carbon nanotube film and the porous perfluorosulfonic acid film with the catalyst layer thereon are overlapped with each other and hot pressed together to form the membrane electrode. A monocell is assembled by using the membrane electrode, a graphite guide plate, and a polytetrafluoroethylene seal ring. A power of the monocell containing 1 gram metal particles is in a range from about 800 W/g to about 1000 W/g.

Depending on the embodiment, certain steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

The above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A membrane electrode comprising:
a first electrode comprising a first gas diffusion layer and a first catalyst layer;
a second electrode comprising a second gas diffusion layer and a second catalyst layer; and
a proton exchange membrane located between the first electrode and the second electrode;
wherein at least one of the first catalyst layer and the second catalyst layer comprises a carbon nanotube-metal particle composite, the carbon nanotube-metal particle composite comprises carbon nanotubes, polymer layer, and metal particles comprising first metal particles, second metal particles, and third metal particles; the polymer layer is coated on a surface of the carbon nanotubes and defines a plurality of uniformly distributed pores, the first metal particles are located in the plurality of uniformly distributed pores; the first metal particles are inside of the polymer layer and spaced from the carbon nanotubes; each of the first metal particles is a nanocluster; and the second metal particles are in direct contact with the surface of the carbon nanotubes, and the third metal particles are located on an outer surface of the polymer layer.

2. The membrane electrode of claim 1, wherein the metal particles located in the plurality of uniformly distributed pores are spaced from each other by a polymer of the polymer layer.

3. The membrane electrode of claim 1, wherein a diameter of the metal particles is in a range from about 1 nanometer to about 5 nanometers.

4. The membrane electrode of claim 1, wherein each of the metal particles is a nanocluster having a diameter of about 1 nanometer to about 2 nanometers.

5. The membrane electrode of claim 4, wherein the nanocluster comprises metal atoms of less than or equal to 55.

6. The membrane electrode of claim 1, a mass percentage of the metal particles to the carbon nanotube-metal particle composite is in a range from about 20% to about 70%.

7. The membrane electrode of claim 1, wherein a polymer of the polymer layer is selected from the group consisting of polyaniline, polypyrrole, polythiophene, polyamide, polypropyleneimine, poly(N-acetylaniline), poly(N-methylpyrrole), poly(3,4-ethylendioxythiophene), polycaprolactam or a combination thereof.

8. The membrane electrode of claim 1, wherein the surface of the carbon nanotubes is functionalized by hydrophilic groups.

9. The membrane electrode of claim 1, wherein the surface of the carbon nanotubes is functionalized by carboxyl groups, the polymer layer is adsorbed with the carbon nanotubes by the carboxyl groups.

10. The membrane electrode of claim 1, wherein only polymer layer is coated on individual carbon nanotube.

11. The membrane electrode of claim 1, wherein a quantity of the metal particles of the carbon nanotube-metal particle composite in the first catalyst layer or the second catalyst layer is in a range from about 0.3 $mg/cm^2$ to about 2 $mg/cm^2$.

12. The membrane electrode of claim 11, wherein the quantity of the metal particles of the carbon nanotube-metal particle composite in the first catalyst layer or the second catalyst layer is less than 0.4 $mg/cm^2$.

13. The membrane electrode of claim 1, wherein the carbon nanotube-metal particle composite is uniformly distributed on the surface of the first gas diffusion layer or the second gas diffusion layer, and sandwiched between the first gas diffusion layer and the proton exchange membrane, or the second gas diffusiong layer and the proton exchange membrane.

14. The membrane electrode of claim 1, wherein the first gas diffusion layer or the second gas diffusion layer defines a plurality of pores, and the carbon nanotube-metal particle composite is distributed in the plurality of pores.

15. A membrane electrode comprising:
a first catalyst layer;
a second catalyst layer; and
a proton exchange membrane sandwiched between the first catalyst layer and the second catalyst layer;
wherein at least one of the first catalyst layer and the second catalyst layer comprises a carbon nanotube-metal particle composite, the carbon nanotube-metal particle composite comprises carbon nanotubes, polymer layer, and metal particles comprising first metal particles, second metal particles, and third metal particles; the polymer layer is coated on a surface of the carbon nanotubes and defines a plurality of uniformly distributed pores, the first metal particles are located in the plurality of uniformly distributed pores, and each of the first metal particles is a nanocluster comprising 55 metal atoms; the first metal particles are inside of the polymer layer and spaced from the carbon nanotubes; and the second metal particles are in direct contact with the surface of the carbon nanotubes.

16. A fuel cell, comprising:
a first guide plate;
a second guide plate, and
a membrane electrode sandwiched between the first guide plate and the second guide plate;
wherein the membrane electrode comprises a first catalyst layer;
a second catalyst layer; and
a proton exchange membrane sandwiched between the first catalyst layer and the second catalyst layer;
wherein at least one of the first catalyst layer and the second catalyst layer comprises a carbon nanotube-metal particle composite, the carbon nanotube-metal particle composite comprises carbon nanotubes, polymer layer, and metal particles comprising first metal particles, second metal particles, and third metal particles; the polymer layer is coated on a surface of the carbon nanotubes and defines a plurality of uniformly distributed pores, the first metal particles are located in the plurality of uniformly distributed pores; the first metal particles are inside of the polymer layer and spaced from the carbon nanotubes; each of the first metal particles is a nanocluster; and the second metal particles are in direct contact with the surface of the carbon nanotubes.

17. The fuel cell of claim 16, wherein a power of the fuel cell containing the metal particles of 1 gram is in a range from about 800 W/g to about 1000 W/g.

18. The membrane electrode of claim 16, wherein each of the metal particles is a nanocluster comprising 55 metal atoms.

19. The membrane electrode of claim 1, wherein only one first metal particle is in each of the plurality of uniformly distributed pores.

20. The membrane electrode of claim 15, wherein the third metal particles are located on an outer surface of the polymer layer.

21. The membrane electrode of claim 16, wherein the third metal particles are located on an outer surface of the polymer layer.

* * * * *